United States Patent
Pradas et al.

(10) Patent No.: US 9,980,182 B2
(45) Date of Patent: May 22, 2018

(54) WIRELESS DEVICE, NETWORK NODE, FIRST RADIO ACCESS NETWORK NODE AND METHODS PERFORMED THEREBY

(71) Applicant: Telefonaktiebolaget LM Ericsson (publ), Stockholm (SE)

(72) Inventors: Jose Luis Pradas, Stockholm (SE); Icaro L. J. da Silva, Bromma (SE); Gunnar Mildh, Sollentuna (SE); Patrik Rugeland, Stockholm (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 15/111,207

(22) PCT Filed: Feb. 26, 2016

(86) PCT No.: PCT/SE2016/050151
§ 371 (c)(1),
(2) Date: Jul. 13, 2016

(87) PCT Pub. No.: WO2017/146623
PCT Pub. Date: Aug. 31, 2017

(65) Prior Publication Data
US 2017/0374585 A1    Dec. 28, 2017

(51) Int. Cl.
*H04W 36/00* (2009.01)
*H04W 36/02* (2009.01)

(52) U.S. Cl.
CPC ..... *H04W 36/0038* (2013.01); *H04W 36/023* (2013.01)

(58) Field of Classification Search
CPC .. H04W 36/0011; H04W 36/02; H04W 36/14
See application file for complete search history.

(56) References Cited

U.S. PATENT DOCUMENTS 8,886,180 B2* 11/2014 O'Neill ............... H04L 12/2856
                                                                370/328
9,240,868 B2*  1/2016 Kish ................... H04L 1/1607
(Continued)

OTHER PUBLICATIONS

Ulvan, Aridan et al., "Handover Scenario and Procedure in LTE-based Femtocell Networks", UBICOMM 2010: The Fourth International Conference on Mobile Ubiquitous Computing, Systems, Services and Technologies, Oct. 30, 2010, 1-6.

*Primary Examiner* — Diane Mizrahi
(74) *Attorney, Agent, or Firm* — Murphy, Bilak & Homiller, PLLC

(57) ABSTRACT

Embodiments herein relate e.g. to a method performed by a network node (15,13) for handling data of a wireless device (10) in a communication network (1). The network node (15,13) receives an indication from the wireless device (10), which indication indicates a presence of the wireless device at a second radio access network node (13) holding no context for the wireless device (10). The network node (15,13) identifies a first radio access network node (12) holding context for the wireless device (10) and any buffered data destined for the wireless device (10). The network node (15,13) retrieves from the identified first radio access network node (12), data buffered for the wireless device (10), and forwards the retrieved data to the wireless device (10).

25 Claims, 10 Drawing Sheets

(56) References Cited

U.S. PATENT DOCUMENTS

| | | | |
|---|---|---|---|
| 9,635,702 B2* | 4/2017 | Miklos | H04W 76/046 |
| 2003/0210676 A1 | 11/2003 | Wu | |
| 2011/0292790 A1 | 12/2011 | Iwamura et al. | |
| 2013/0260740 A1 | 10/2013 | Rayavarapu | |
| 2016/0219473 A1* | 7/2016 | Teyeb | H04W 36/0088 |
| 2016/0330612 A1* | 11/2016 | Mildh | H04W 8/24 |
| 2017/0078924 A1* | 3/2017 | Rydnell | H04W 36/0077 |

* cited by examiner

WIRELESS DEVICE, NETWORK NODE, FIRST RADIO ACCESS NETWORK NODE AND METHODS PERFORMED THEREBY

TECHNICAL FIELD

Embodiments herein relate to a network node, a first radio access network node, a wireless device and methods performed thereby for communication in a communication network. Furthermore, a computer program and a computer readable storage medium are also provided herein. In particular, embodiments herein relate to handling data of the wireless device in the communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio access network (RAN) node e.g., a Wi-Fi access point or a radio base station (RBS), which in some networks may also be called, for example, a "NodeB" or "eNodeB". The area or cell area is a geographical area where radio coverage is provided by the radio access network node. The radio access network node communicates over an air interface operating on radio frequencies with the wireless device within range of the radio access network node. The radio access network node communicates over a downlink (DL) to the wireless device and the wireless device communicates over an uplink (UL) to the radio access network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the $3^{rd}$ Generation Partnership Project (3GPP), telecommunications suppliers propose and agree upon standards for third generation networks and UTRAN specifically, and investigate enhanced data rate and radio capacity. In some RANs, e.g. as in UMTS, several radio access network nodes may be connected, e.g., by landlines or microwave, to a controller node, such as a radio network controller (RNC) or a base station controller (BSC), which supervises and coordinates various activities of the plural radio access network nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the radio access network nodes are directly connected to the EPC core network. As such, the Radio Access Network (RAN) of an EPS has an essentially "flat" architecture comprising radio access network nodes connected directly to one or more core networks.

In LTE, a wireless device may encounter a radio link failure (RLF). The criteria for RLF is based on that the wireless device starts a timer when it detects radio link problems. If the radio link problems stop the timer resets, but if the timer times out before the radio link problems have stopped the wireless device will initiate a radio link failure procedure. When this happens, the wireless device performs a cell re-selection and re-establishes the connection towards the network. The most likely scenario is that the wireless device selects and camps in a different cell than from the one the wireless device was connected to when the wireless device experienced the RLF.

When the wireless device performs the re-establishment of the connection, the wireless device will first try to re-establish a Radio Resource Control (RRC) connection with the RAN. If this fails e.g. due to that the radio access network node does not have access to a RRC context for the wireless device, the wireless device will start a new RRC connection and send a Non Access Stratum (NAS) service request message, in order to be able to re-establish the connection based on CN/NAS layer information.

During this process, the radio access network node, to which the wireless device was connected when the wireless device experienced the RLF, may be buffering the wireless device DL data. If the wireless device succeeds with the re-establishment of the connection, the wireless device will typically be able to recover any packets stored in the radio access network node serving the cell the wireless device was previously served in but if the wireless device fails to re-establish the RRC connection it is today not possible to recover any packets since the wireless device will initiate another RRC connection and the context will be re-built from the CN context. During this procedure the CN will release an old S1 connection to the radio access network node where any packets are stored and these will be lost. All the data buffered in the radio access network node may thus be lost and not re-directed to a new radio access network node in which the wireless device tries to connect after a RLF event or in other situations when the wireless device moves to a different radio access network node. Transport layer or application layers may recover the packets; however, that implies a considerable delay. This results in a limited or poor performance of the communication network.

SUMMARY

An object of embodiments herein is to provide a mechanism that improves performance of the communication network in an efficient manner.

According to an aspect of embodiments herein the object is achieved by providing a method performed by a network node for handling data of a wireless device in a communication network. The network node receives an indication from the wireless device, which indication indicates a presence of the wireless device at a second radio access network node holding no context for the wireless device. The network node may be the second radio access network node or a core network node associated with the second radio access network node. The network node further identifies a first radio access network node holding context for the wireless device and any buffered data destined for the wireless device, and retrieves from the identified first radio access network node, data buffered for the wireless device. The network node forwards the retrieved data to the wireless device.

According to another aspect of some embodiments herein the object is achieved by providing a method performed by a wireless device for handling data of the wireless device in a communication network. The wireless device receives, from a first radio access network node serving the wireless device in a first service area of the first radio access network node, a context identity identifying a context for the wireless device. The wireless device further transmits an indication to a network node being associated with or being a second radio access network node lacking the context for the wireless device. Thus, the network node may be a core network node associated with the second radio access network node or may be the second radio access network node. The indication indicates a presence of the wireless device at the second radio access network node. The wireless device also forwards the received context identity from the wireless device to the network node. The wireless device further receives data, buffered at the first radio access network node, from the network node. It should be noted that this context identity may in some embodiments of the network node be used to identify the first radio access network node.

According to yet another aspect of embodiments herein the object is achieved by providing a method performed by a first radio access network node for handling data of a wireless device in a communication network. The first radio access network node holds context for the wireless device. The first radio access network node buffers data for the wireless device. The first radio access network node further receives, from a network node, being associated with or being a second radio access network node, lacking the context for the wireless device, a request for the buffered data for the wireless device. The first radio access network node also transmits a response, to the network node, with the buffered data.

According to still another aspect of embodiments herein the object is achieved by providing a network node for handling data of a wireless device in a communication network. The network node is configured to receive an indication from the wireless device, which indication indicates a presence of the wireless device at a second radio access network node holding no context for the wireless device. The network node is further configured to identify a first radio access network node holding context for the wireless device and any buffered data destined for the wireless device. The network node is also configured to retrieve, from the identified first radio access network node, data buffered for the wireless device, and to forward the retrieved data to the wireless device.

According to another aspect of embodiments herein the object is achieved by providing a wireless device for handling data of the wireless device in a communication network. The wireless device is configured to receive, from a first radio access network node serving the wireless device in a first service area of the first radio access network node, a context identity identifying a context for the wireless device. The wireless device is further configured to transmit an indication to a network node being associated with or being a second radio access network node lacking the context for the wireless device, which indication indicates a presence of the wireless device at the second radio access network node. The wireless device is also configured to forward the received context identity from the wireless device to the network node. The wireless device is further configured to receive data, buffered at the first radio access network node, from the network node.

According to yet still another aspect the object is achieved by providing a first radio access network node for handling data of a wireless device in a communication network. The first radio access network node holds context for the wireless device. The first radio access network node is configured to buffer data for the wireless device. The first radio access network node is further configured to receive, from a network node, being associated with or being a second radio access network node, lacking the context for the wireless device, a request for the buffered data for the wireless device. The first radio access network node is also configured to transmit a response, to the network node, with the buffered data.

It is furthermore provided herein a computer program comprising instructions, which, when executed on at least one processor, cause the at least one processor to carry out any of the methods above, as performed by the network node, the first radio access network node or the wireless device. It is additionally provided herein a computer-readable storage medium, having stored thereon a computer program comprising instructions which, when executed on at least one processor, cause the at least one processor to carry out the method according to any of the methods above, as performed by the network node, the first radio access network node or the wireless device.

An advantage of embodiments herein is that the network node, such as the second radio access network node or the core network node associated with the second radio access network node, retrieves data buffered for the wireless device at the first RAN node and forwards the data to the wireless device in an efficient manner. Thus, the data buffered at the first RAN node is not lost and is delivered to the wireless device, thereby improving the performance of the communication network in an efficient manner.

BRIEF DESCRIPTION OF THE DRAWINGS

Embodiments will now be described in more detail in relation to the enclosed drawings, in which.

DETAILED DESCRIPTION

Figure 1:
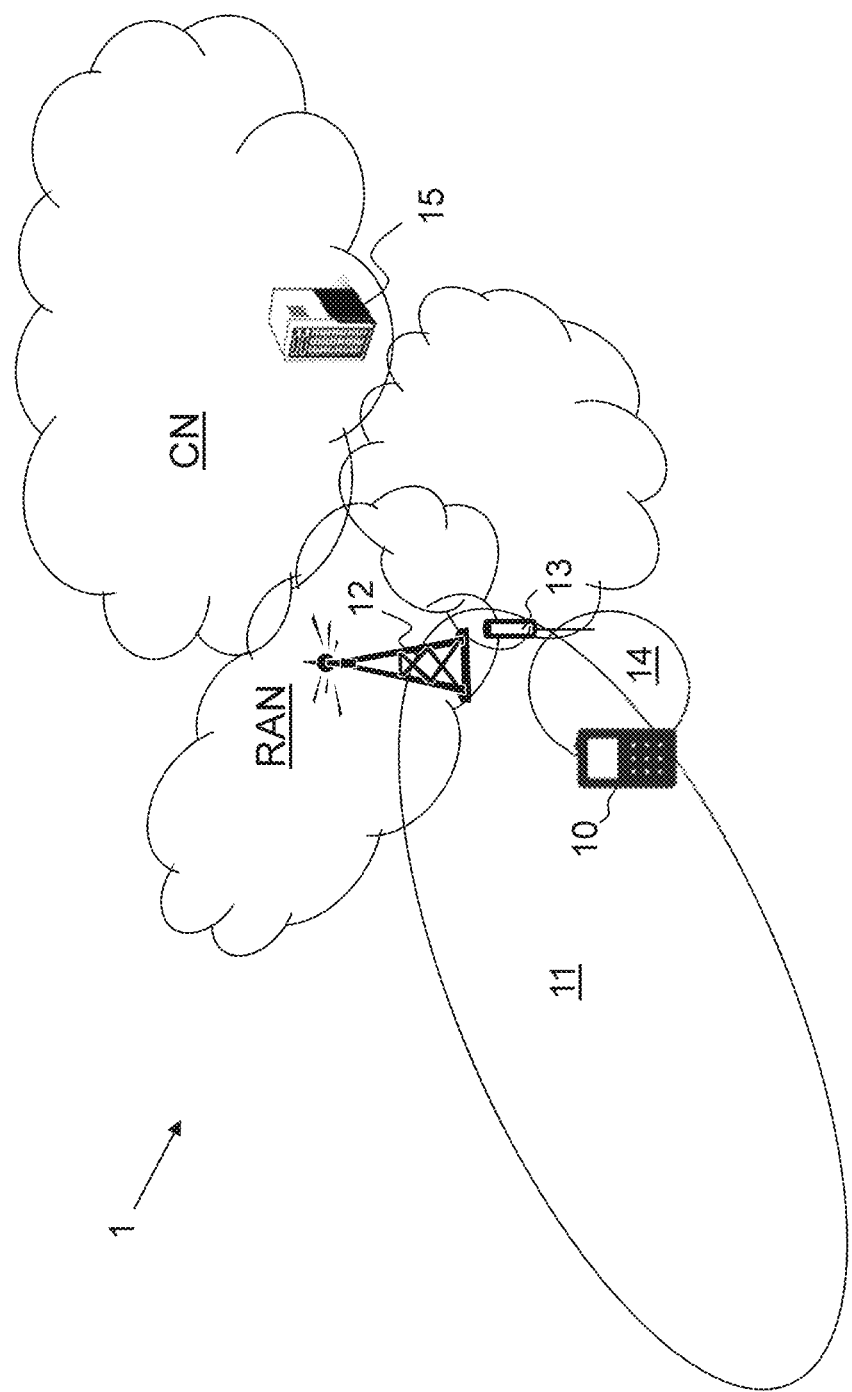
FIG. 1 is a schematic overview depicting a communication network according to embodiments herein.

Embodiments herein relate to communication networks in general. A communication network may also be referred to as a wireless communication network or a radio communications network. FIG. 1 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing communication systems such as e.g. WCDMA and LTE.

In the communication network 1, wireless devices e.g. a wireless device 10, also known as mobile stations, non-access points (non-AP) STAs, STAs, user equipment and/or wireless terminals, communicate via one or more Access Networks (AN), e.g. RAN, with one or more CNs. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The communication network 1 comprises a first radio access network node 12 providing radio coverage over or serving a geographical area, a first service area 11 or first cell, of a first radio access technology (RAT), such as 5G, Wi-Fi, WiMAX, LTE, UMTS or similar. The first radio access network node 12 may be a transmission and reception point e.g. a radio network node such as a base station, e.g. a radio base station such as a NodeB, an evolved Node B (eNB, eNode B), a base transceiver station, a radio remote unit, a Wireless Local Area Network (WLAN) access point or an Access Point Station (AP STA), an access controller an Access Point Base Station, a radio network controller, a base station controller, a base station router, a transmission arrangement of a radio base station, a stand-alone access point or any other network unit capable of communicating with a wireless device within the area served by the first radio access network node 12 depending e.g. on the first radio access technology and terminology used. The first radio access network node 12 may be referred to as a serving access node and may communicate with wireless devices with DL transmissions to the wireless devices and UL transmissions from the wireless devices. The first radio access network node 12 is exemplified herein as an LTE eNB, a 5G node or a corresponding RAN node.

Furthermore, the communication network 1 comprises a second radio access network node 13 providing radio coverage over a geographical area, a second service area 14 or second cell, of a second RAT, such as 5G, Wi-Fi, WiMAX, LTE or similar. The first and second RATs are the same RAT or different RATs and the second service area 14 may be at least partly within the first service area 11. The second radio access network node 13 may be a transmission and reception point e.g. a radio network node such as a WLAN access point or an Access Point Station (AP STA), an access controller, an access node, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the second radio access network node 13 depending e.g. on the second radio access technology and terminology used. The second radio access network node 13 is exemplified herein as a 5G network node or an LTE eNB.

The second radio access network node 13 may communicate with the first radio access network node 12 in the communication network 1. This is done by communicating with one another over a backhaul connection, e.g. an X2 connection, an S1 connection, a combination of an X2 and S1 connection or similar, between the first radio access network node 12 and the second radio access network node 13.

The communication network 1 may further comprise a core network node 15 such as a Mobility Management Entity (MME), serving gateway or similar handling e.g. mobility or security communication in the communication network. The core network node 15 may be associated with the second radio access network node 13 by being connected via a S1 interface or similarly. According to embodiments herein the second radio access network node 13 and the core network node 15 are examples of a network node in the communication network 1.

Figure 2:
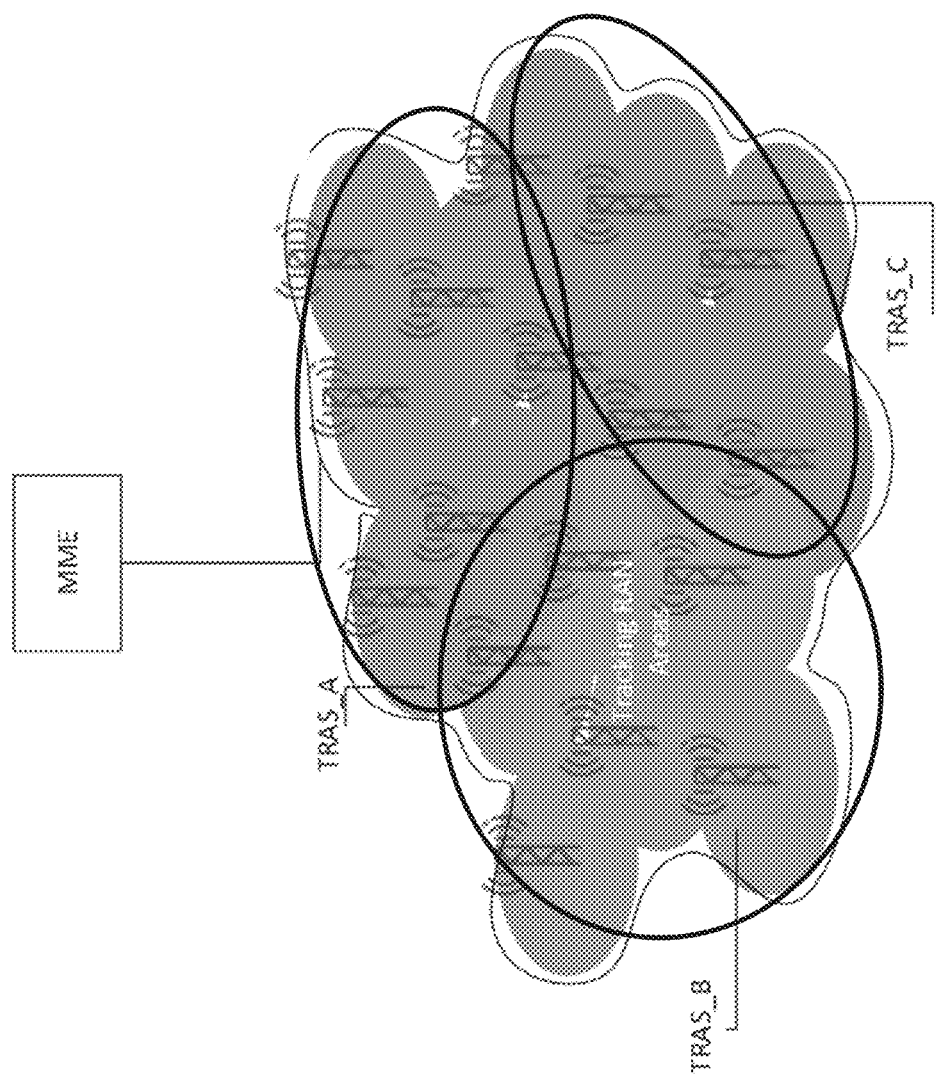
FIG. 2 is a schematic overview depicting a communication network providing spotty coverage.

As part of current research on the evolution of LTE and new 5G RATs it is considered to introduce a new RAN based sleep state. This sleep state is herein referred to as RRC Dormant. RRC dormant could have similar properties as an LTE Idle Mode. One of the main differences, though, is that in this sleep state the wireless device 10 is always in Connected state from the CN point of view. e.g. that the connection between the CN node and the RAN, e.g. the S1 connection or association, is kept for the wireless device, meaning the CN sends a packet to the radio access network node where the CN node assumes the wireless device 10 is currently located in. Thus, if the wireless device 10 is located in one of the cells belonging to this radio access network node or in the coverage area of this radio access network node it should be possible for that radio access network node to deliver the packet to the wireless device 10, possibly after first paging the wireless device 10. This possibility for the RAN to deliver data to a wireless device in RRC Dormant state, whose precise location is not known, may also be extended to service areas, beyond one radio access network node, e.g. to the service areas of all the X2 neighbor radio access network nodes of the radio access network node serving an S1 connection to the core network or even including coverage areas of radio access network nodes which do not have an X2 interface towards the radio access network node serving the S1 connection to the CN. More generally, one characteristic of this proposed RRC Dormant state is that the wireless device 10 should be allowed to move over an area e.g. consisting of multiple cells or service areas where not the whole area is served by the same radio access network node. One solution in this case is that the wireless device 10 in RRC Dormant is configured with a Tracking RAN Area (TRA), or a list of Tracking RAN Area such as a TRA List. The TRA may typically comprise a subset of the cells contained in a tracking area (TA), but they may also lack relation to the tracking areas, i.e. TAs and TRAs may be coordinated, but they do not have to be. Hence, TRAs may or may not expand across multiple Tracking Areas, example FIG. 2. Each TRA is defined by a broadcast signal carrying a Tracking RAN Area code (TRAC). In RRC Dormant or sleeping state(s) the wireless device 10 is configured to monitor the TRAC or Tracking RAN Area signals (TRAS) carrying the TRAC. e.g. TRAS_A, TRAS_B, TRAS_C in FIG. 2, so that when the wireless device 10 enters a different TRA, or a TRA outside the configured Tracking RAN Areas, the wireless device 10 may transmit a Tracking RAN Area Update.

In the RRC Dormant state(s), the S1 connection is maintained for the wireless device. Therefore, in that RRC Dormant state the wireless device 10 is contacted via paging which is controlled and initiated by the RAN. The main purpose of the Tracking RAN Area Update is to assist the network to locate the wireless device in case the network needs to address the wireless device 10. The network is likely to send paging indications to the wireless device 10 within the Tracking RAN Area, or the list of Tracking RAN Areas, that the wireless device 10 is configured with, and may expand the area where the paging is performed if the wireless device 10 is not located within the area. Thus, when the wireless device 10 decodes a TRAC, which TRAC is not within its configured list, the wireless device 10 performs a Tracking RAN Area Update and an updated list and an updated configuration may be provided to the wireless device 10. The Tracking RAN Area Updates provide enough information to the network node to locate the wireless device 10 within a certain region. This is used when the network needs to locate the wireless device 10 to e.g. transmit data to the wireless device 10.

As part of developing embodiments herein a problem has been identified for the wireless device 10 when it moves e.g. from one TRA to a second TRA. The wireless device 10 may after the wireless device has moved to the second TRA send, if configured by the network, a TRA Update. There may be cases in which the network, the RAN Node, may be sending paging indications to the wireless device 10 in the first service area 11 when the wireless device 10 is in the second service area 14. In this case there needs to be a solution to be able to recover the packets, i.e. buffered data, in the old RAN node which triggered the paging, otherwise these packets would be lost, unless it can be recovered at Application layer, which takes time.

A solution is herein provided for when the wireless device 10 relocates to a different TRA, which is outside the list of TRAs configured for the wireless device 10 in case lists of TRAs are used, and the wireless device 10 sends a TRA Update (TRAU) to the second radio access network node lacking context for the wireless device 10. Furthermore, the solution also covers the case, mentioned in the background, when the wireless device 10 makes a cell selection after an RLF and performs a connection recovery, e.g. a NAS layer recovery in e.g. LTE, for reestablishment of the connection to the second radio access network node lacking context for the wireless device 10. The connection recovery and the TRAU are both indications of presence, of the wireless device 10, at the second radio access network node 13. According to embodiments herein the second radio access network node 13 or the core network node 15, herein commonly referred to as the network node, identifies the first radio access network node 12 holding or comprising context for the wireless device 10 and any buffered data destined for the wireless device 10. That the first radio access network node 12 holds context for the wireless device 10 means it is a RAN node with one or more Signaling Radio Bearers (SRB) for carrying e.g. RRC and NAS connections, one or more Data Radio Bearers (DRB) for carrying user data to the wireless device 10 and/or an S1 association or connections associated with the wireless device 10. The context may potentially also contain other configuration data. Hence, the first radio access network node 12 was previously serving the wireless device 10 and may have data, also referred to as user data, buffered for the wireless device 10 intended to be delivered to the wireless device 10 using the context of the wireless device 10 in the first radio access network node 12. The network node, i.e. either the second radio access network node 13 or the core network node 15, detecting the indication retrieves any buffered data from the first radio access network node 12. The buffered data is then delivered to the wireless device 10, which is now located in the second service area 14, and thus, the performance of the communication network 1 is improved in an efficient manner.

Figure 3:
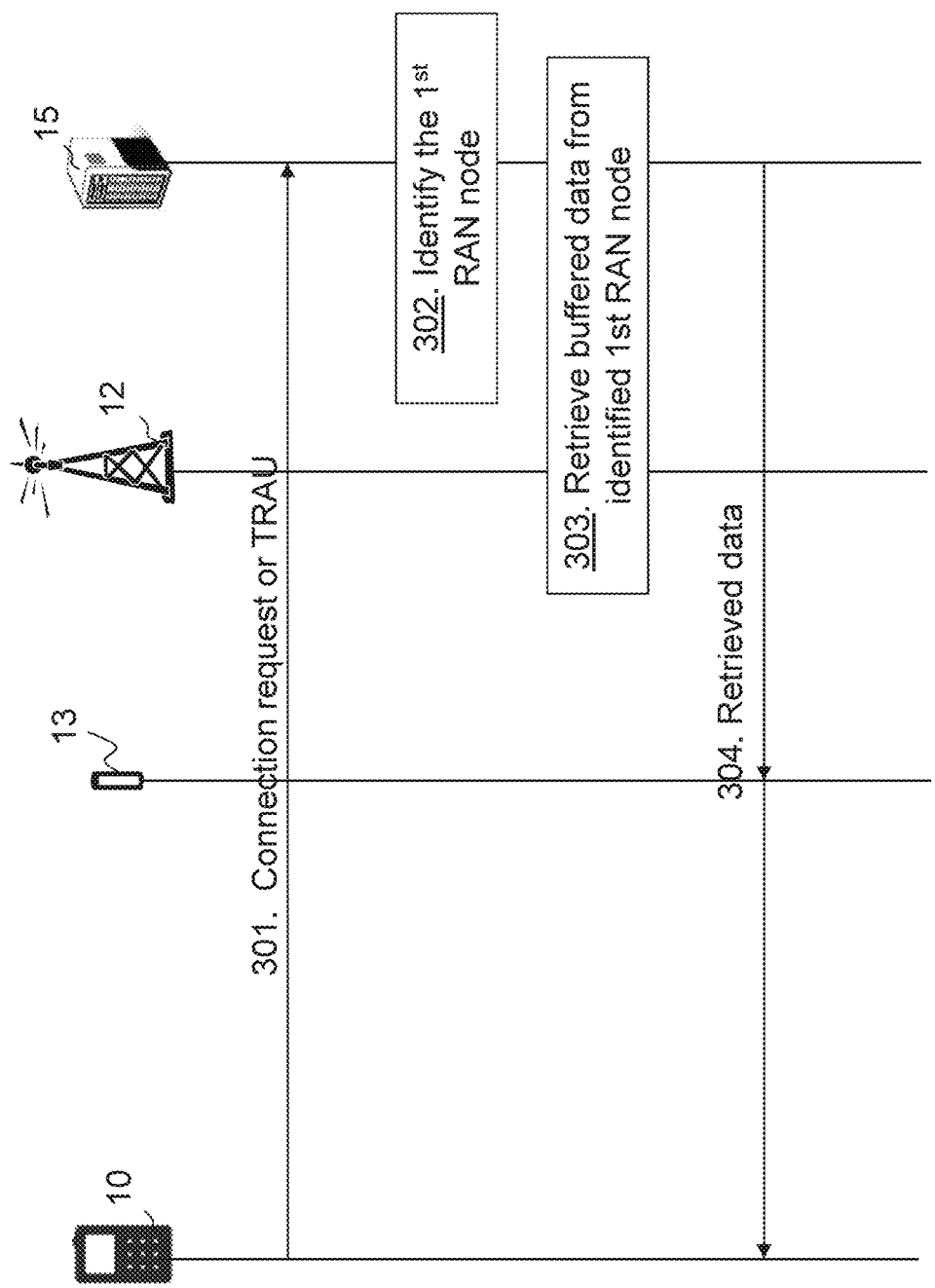
FIG. 3 is a combined flowchart and signalling scheme according to embodiments herein.

FIG. 3 is a combined flowchart and signaling scheme according to embodiments herein, wherein the network node is exemplified as the core network node 15.

Action 301.

The wireless device 10 transmits the indication indicating the presence of the wireless device 10 at the second radio access network node 13. Indicating presence at the second radio access network node 13 means that the wireless device 10 indicates that it is in range of the second radio access network node 13 for communication. The indication may be any message indicating the presence at the second radio access network node 13 e.g. a connection request, an update message, an access message, any message identifying the wireless device or similar. It should here be noted that the indication may comprise information not related to a location of the wireless device 10. The indication may be an RLF indication, e.g. a connection request such as an RRC establishment message, or some NAS signaling upon a RLF in the first service area 11. Alternatively or additionally, the wireless device 10 may identify an area/location, e.g. the second service area 14, and if the second service area 14 is part of a tracking RAN area not contained in a Tracking RAN Area list which the network has provided to the wireless device 10, the wireless device 10 does an update of the Tracking RAN Areas, e.g. transmits a Tracking RAN Area Update (TRAU). The RLF indication or the TRAU is detected, e.g. received or informed, at the core network node 15.

Action 302.

The core network node 15 identifies the first radio access network node 12 holding context for the wireless device 10 as well as any buffered data destined for the wireless device 10, e.g. identifies a RAN node previously serving the wireless device 10. For example, the core network node 15 may identify a Tracking RAN Area in which the wireless device 10 was located before, or may identify the first radio access network node 12 from which the core network node 15 may retrieve buffered data for the wireless device 10. The identification of the first radio access network node 12 may be achieved e.g. by one or more of the examples mentioned in action 503 in conjunction with FIG. 5. Thus, the reception of e.g. the TRAU triggers a transfer of the context from the previous RAN node, the first RAN node 12, to the new RAN node, the second RAN node 13. The S1 connection, or more precisely: the RAN side endpoint of the S1 connection, will also be moved to the second RAN node 13. This will be signalled as a path switch request to the CN. i.e. it will look like a handover from the CN's perspective.

Action 303.

The core network node 15 then retrieves the buffered data for the wireless device 10 from the identified first radio access network node 12. The core network node 15 may further retrieve context for the wireless device 10, also known as User Equipment (UE) context, from the identified first radio access network node 12 such as session context information of signaling radio bearers and data bearers e.g. source IP address and port number and a destination IP address and port number of a bearer connection across the S1 interface or QoS information associated with a bearer, the international mobile subscriber identity (IMSI), Cell Identity (C-ID) of where the wireless device was located before entering e.g. a RRC Dormant state, previously recorded statistics for the wireless device 10, e.g. traffic patterns or used applications, and possible access restrictions e.g. in terms of Tracking RAN Areas that may be forbidden for the wireless device 10 to access the network in.

Action 304.

The core network node 15 then forwards the retrieved buffered data to the wireless device 10 e.g. via the second radio access network node 13.

Figure 4:
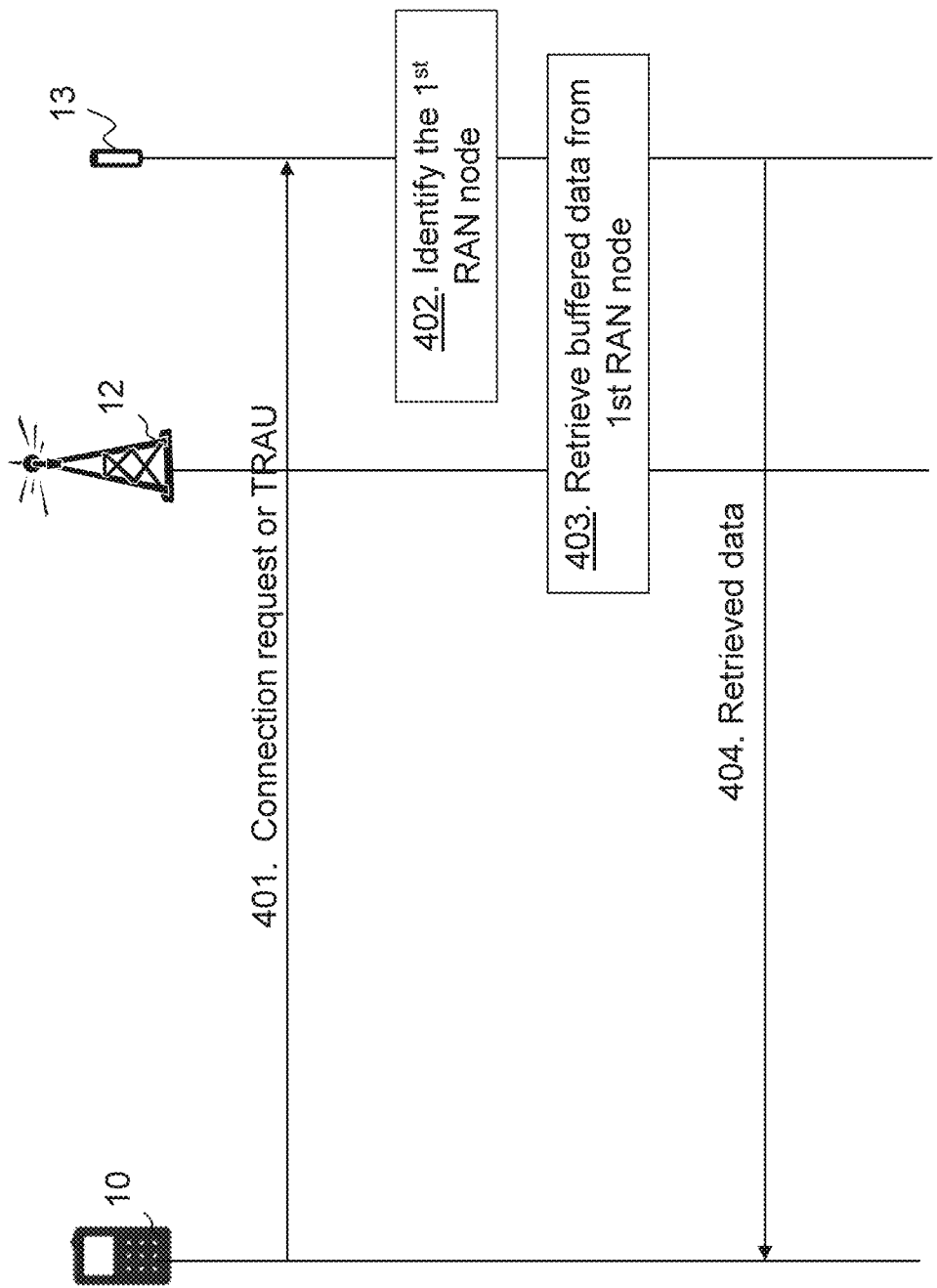
FIG. 4 is a combined flowchart and signalling scheme according to embodiments herein.

FIG. 4 is a combined flowchart and signaling scheme according to embodiments herein, wherein the network node is exemplified as the second radio access network node 13.

Action 401.

The wireless device 10 transmits the indication indicating the presence of the wireless device 10 at the second radio access network node 13. The indication may be an RLF indication, e.g. a connection request such as an RRC establishment message, or some NAS signaling upon a RLF in the first service area 11. Alternatively or additionally, the wireless device 10 may identify an RAN area/location, e.g. the second service area 14, and if the second service area 14 is part of a tracking RAN area not contained in the tracking RAN area list which the network has provided to the wireless device 10, the wireless device does an update of the Tracking RAN Area, e.g. transmits a Tracking RAN Area Update (TRAU). The RLF indication or the TRAU is detected, e.g. received or informed, at the second radio access network node 13.

Action 402.

The second radio access network node 13 identifies the first radio access network node 12 comprising the context for the wireless device 10 as well as any buffered data destined for the wireless device 10, e.g. identifies a RAN node previously serving the wireless device 10. For example, the second radio access network node 13 may identify the Tracking RAN Area in which the wireless device 10 was before, or may identify, e.g. based on a context identity of the context for the wireless device 10, the first radio access network node 12 from which the second radio access network node 13 could retrieve further information related to the wireless device 10. The identification of the first radio access network node 12 may be achieved e.g. by one or more of the examples mentioned in action 503 in conjunction with FIG. 5. Hence, the reception of e.g. the TRAU triggers a transfer of the UE context from the previous RAN node, the first RAN node 12, to the new RAN node, the second RAN node 13. The S1 connection, or more precisely: the RAN side endpoint of the S1 connection, will also be moved to the second RAN node 13. This will be signalled as a path switch request to the CN, i.e. it will look like a handover from the CN's perspective.

Action 403.

The second radio access network node 13 then retrieves buffered data for the wireless device 10 from the identified first radio access network node 12. The second radio access network node 13 may further retrieve the context for the wireless device 10 from the identified first radio access network node 12, such as session context information of signaling radio bearers and data bearers e.g. source IP address and port number and a destination IP address and port number of a bearer connection across the S1 interface or QoS information associated with a bearer, the international mobile subscriber identity (IMSI), Cell Identity (C-ID) of where the wireless device was located before entering e.g. a RRC Dormant state, previously recorded statistics for the wireless device 10, e.g. traffic patterns or used applications, and possible access restrictions e.g. in terms of Tracking RAN Areas that may be forbidden for the wireless device 10 to access the network in.

Action 404.

The second radio access network node 13 then forwards the retrieved buffered data to the wireless device 10, e.g. in a TRAU response or in another message, or as user data.

Figure 5:
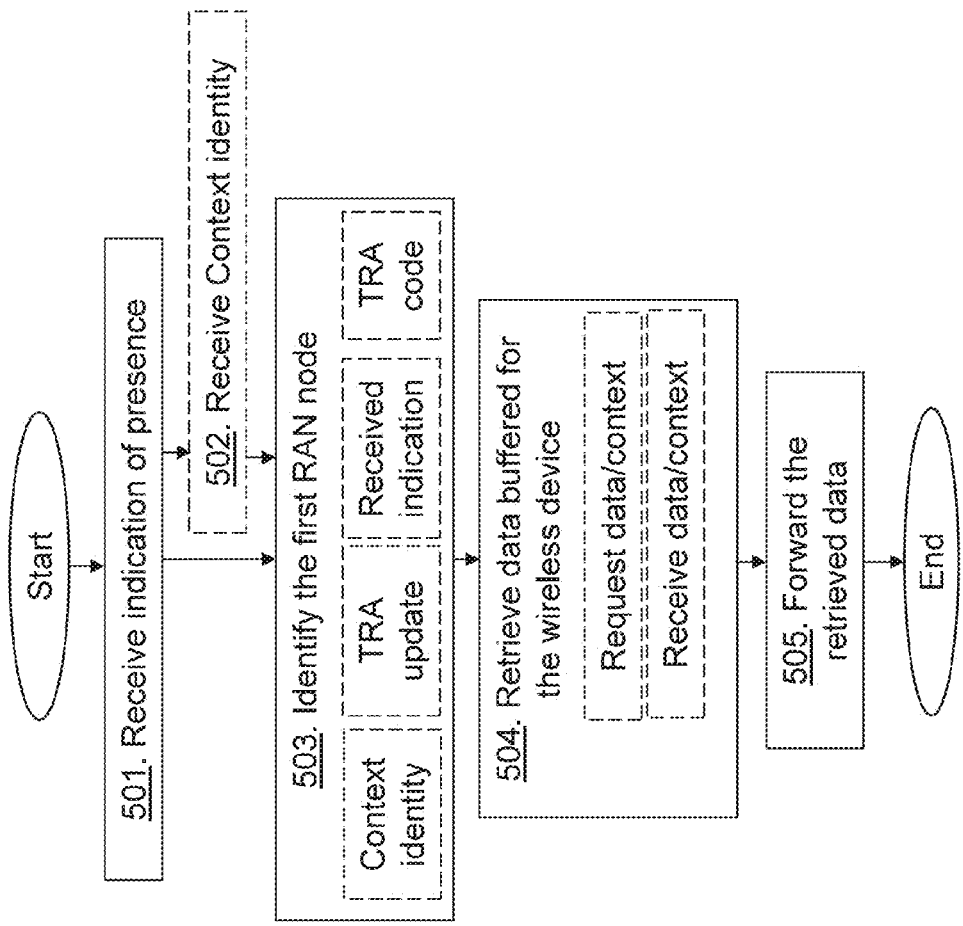
FIG. 5 is a flowchart depicting a method performed by a network node according to embodiments herein.

The method actions performed by the network node, exemplified herein as the second radio base station 13 or the core network node 15, for handling data of the wireless device 10 in the communication network 1 according to some embodiments will now be described with reference to a flowchart depicted in FIG. 5. The actions do not have to be taken in the order stated below, but may be taken in any suitable order. Actions performed in some embodiments are marked with dashed boxes.

Action 501.

The network node receives the indication from the wireless device 10, which indication indicates the presence of the wireless device 10 at the second radio access network node 13 holding no context for the wireless device 10. Thus, the second radio access network node 13 is not associated with a previous tracking RAN area for the wireless device 10 or has not served the wireless device 10 previously. The indication may be a reestablishment of a connection, such as NAS signalling or RRC connection reestablishment, or an Update of tracking RAN areas e.g. a TRAU.

Action 502.

The network node may in some embodiments receive a context identity from the wireless device 10, which context identity identifies the context for the wireless device 10.

Action 503.

The network node identifies the first radio access network node 12 holding context for the wireless device 10 and any buffered data destined for the wireless device 10. E.g. the network node may identify from a tracking RAN area update message the first radio access network node 12 which comprises the context. That the first radio access network node 12 holds context for the wireless device 10 means as stated above an indication that the first radio access network node 12 may have data buffered for the wireless device 10 intended to be delivered to the wireless device 10 using the context in the first radio access network node 12. The received indication may comprise information, which information indicates identity of the first radio access network node 12 comprising the context for the wireless device 10 and any buffered data destined for the wireless device 10, and which information is used for performing the identification of the first radio access network node 12. For example, the network node that receives the TRA Update may access another network node which comprises Tracking RAN Area information and/or context information, e.g. bearer (e.g. SRB and/or DRB) configuration data, for the wireless device 10. This could for instance be radio access network nodes in adjacent/nearby Tracking RAN Areas from which it is likely that the wireless device 10 relocated or a radio access network node that the wireless device 10 or another wireless device previously has reported leaving. In another example, the TRA Update message sent by the wireless device 10 may comprise relevant information which helps to identify the previous Tracking RAN Area or network nodes comprising the context. This relevant information could be the Tracking RAN Area code/identity, the identity of the first radio access network node 12 towards which an S1 connection or association exists, the identity of a last node to which the wireless device 10 was connected i.e. the first radio access network node 12, or identity of a node e.g. the first radio access network node 12, which the network previously indicated to the wireless device 10 and should be reported in the Tracking RAN Area update. In some embodiments, the information provided in the TRAU and/or the connection reestablishment uniquely identifies the first radio access network node 12 holding the context for the wireless device 10, i.e. the radio access network node responsible for the S1 connection or association, e.g. denoted "anchor node". This could be an IP address of the first radio access network node 12 or an identifier from which a Fully Qualified Domain Name (FQDN) can be constructed, which the network node receiving the TRAU can resolve into an IP address via a Domain Name Server (DNS) query. The latter may be preferable, e.g. if an operator does not wish to disclose the IP addresses of its RAN nodes or if the operator wants to be able to update these IP addresses without consequences on context retrieval. The DNS record sent in response to the DNS query may have a long Time To Live (TTL) indication, so that the receiving network node can cache it for a long time in order to speed up future FQDN to IP address translations concerning the same first radio access network node 12. The TRA code/identity of the first radio access network node 12 may also be used to point out the first radio access network node 12, provided that only the first radio access network node 12 serves this TRA. The TRA code/identity could then be used to construct a FQDN which may be resolved into an IP address via a DNS query. If the TRA is served by multiple radio access network nodes, then the DNS query for the FQDN constructed from the TRA code/identity at the second radio access network node 13 would have to trigger a DNS response with a list of IP addresses, i.e. at least one for each of the radio access network nodes serving the TRA, and the second radio access network node 13 receiving the TRAU would have to contact all of them, either all in parallel, to be fast, or one at a time until the one holding the context has been found, to save transport network resources.

To locate the first radio access network node 12 node holding the context, an identifier identifying the actual context within this first radio access network node 12 may be used, see e.g. the use of the context identity in action 502. This context identity may be provided to the wireless device 10 by the first radio access network node 12 holding the context, either when the context is created or when the wireless device 10 is switched to the RRC Dormant state or possibly some time in between, and forwarded from the wireless device 10 to the second radio access network node 13 in the TRAU. This context identity may or may not also serve as an identifier of the wireless device 10 e.g. in signaling procedures across the radio interface. The context identity may be combined with data, which data aids when determining location of the first radio access network node 12, e.g. an anchor node identity, into a single identifier.

Action 504.

The network node retrieves, from the identified first radio access network node 12, data buffered for the wireless device 10. The network node may use the received context identity, see action 502, when retrieving the buffered data. The network node may retrieve the data by requesting, directly e.g. over an X2 connection when the network node is the second radio access network node 13, or via core network, over an S1 interface when the network node is the second core network node 15 or the second radio access network node 13 with no X2 connection to the first radio network node 12, the identified first radio access network node 12 for the context for the wireless device 10 and data buffered for the wireless device 10. The network node may then receive a response, from the identified first radio access network node 12, directly over X2 interface or via core network over S1 interfaces, with the requested context and the data buffered for the wireless device 10. The network node may identify the first radio access network node 12, e.g. being the anchor node, and then the network node receiving the TRA Update message retrieves the context and other information related to the wireless device 10. This other information may be paging indications or paging messages which were being addressed to the wireless device 10 but could not be delivered in addition to the user data destined to the wireless device 10 which is buffered in the first radio access network node 12 holding the S1 connection. To retrieve the context and related information/data, and any buffered data destined for the wireless device, the network node receiving the TRAU may establish a connection and send a request including e.g. the context identifier to the first radio access network node 12, using the IP address acquired as described above. This exchange of information may be protected by a security mechanism including e.g. encryption and message authentication. This may be achieved by establishing the connection, or sending the request, via an operator's secure network domain to which the RAN nodes, e.g. the first and second RAN nodes, may be connected via secure tunnels, e.g. IPsec tunnels, to security gateways. Alternatively, the connection may be established, or the request may be sent, across a transport network outside the operators secure domain, but protected by a security relation established on the fly based on cryptographic certificates.

When a connection has been established between the first and second RAN nodes in this way, possibly with an associated security relation, the connection and its possible security relation may optionally be kept for a period of time, in order to speed up future context retrievals between the same RAN nodes. Such a context retrieval may even be used as a trigger to establish an X2 interface, or a similar 5G interface, between the two RAN nodes.

An alternative to retrieving the context directly between the RAN nodes may be to use the core network as a relay. Based on the more or less refined information, e.g. IP address, anchor node identifier, TRA code/identifier, FQDN, the core network would locate the first radio access network node 12, retrieve the context and any buffered data and forward it to the network node, being the second radio access network node 13, receiving the TRAU upon request from the network node, being the second radio access network node 13. A variation of this could be, when the network node is the second radio access network node 13, that the core network forwards the request and the triggered response is comprised in transparent containers between the two RAN nodes. Yet another variation could be that the core network only helps the network node, when being the second radio access network node 13, receiving the TRAU to look up the IP address of the first radio access network node 12 and then the context and any buffered data is retrieved directly between the RAN nodes, as described above.

Action 505.

The network node then forwards the retrieved data to the wireless device 10. The retrieved context may be used to assist the network node to transmit the buffered data to the wireless device 10. For example, it may comprise identity or identities of the wireless device 10 or other relevant information for the transmission to the wireless device 10.

The indication provided by the wireless device 10 to the second radio access network node 13 may be a TRAU and then the network node may forward the retrieved data by transmitting the retrieved data in a Tracking Radio Access Network Area Response, TRA Update Response or TRA Update Acknowledge message. That is, the retrieved data may be forwarded without paging the wireless device 10 in the second service area 14. The response message may further comprise e.g. an updated list of Tracking RAN Areas.

The second radio access network node 13 may send to the first radio access network node 12 a response indicating updates in the context for the wireless device 10 such as UE context comprising e.g. identifiers, Discontinuous Reception (DRX) data, established bearers, Quality of Service associated with bearers or the like. E.g. exchanging context updates may occur e.g. when the first radio access network node 12 is a "home node" where the context for the wireless device 10 is kept. This may imply, for example, that the S1 connection is kept towards that first radio access network node 12. The second radio access network node 13 could change or modify parts of the configuration e.g. identifiers, DRX data, etc. In such case, the second radio access network node 13 may inform the first radio access network node 12 so it can store the updated information. In other cases, the context for the wireless device 10 could be transferred to the second radio access network node 13.

Alternatively or additionally, the network node may forward the data by paging the wireless device 10 in the Tracking Radio Access Network Area Update Response and, upon response of the paging, delivering the retrieved data to the wireless device 10. When the network node e.g. prepares the Tracking RAN Area Response, the network node may attach the pending paging indication/messages into the Tracking RAN Area Update Response, while any retrieved user data is now buffered in the network node sending the Tracking RAN Area Update Response. When the wireless device 10 responds to the paging by contacting the network node, the network node, now buffering the user data, delivers the user data to the wireless device 10.

The network node may retrieve a paging indication for the wireless device 10 from the first radio access network node 12, and then the network node may forward the data by paging the wireless device 10 with the retrieved paging indication, e.g. the paging indication may be comprised in a TRAU response.

The second radio access network node 13 may identify the first radio access network node 12 which comprises or holds the context and any buffered data destined for the wireless device 10. The first and second RAN node may exchange information such as, for instance, relevant context, or pending paging indications/messages, including buffered data. This information may be attached in the response towards the wireless device 10. If the wireless device receives a Tracking RAN Area response which comprises paging indication(s) or paging message(s), the wireless device 10 responds to the paging indication or message and receives the buffered data.

Thus, embodiments herein provide a mechanism to piggyback also known as to attach paging indication/messages/user data which have been buffered in the first RAN node 12 to a response to the network node e.g. belonging to a different Tracking RAN Area, thereby avoiding packet losses and data delivery delays.

Figure 6:
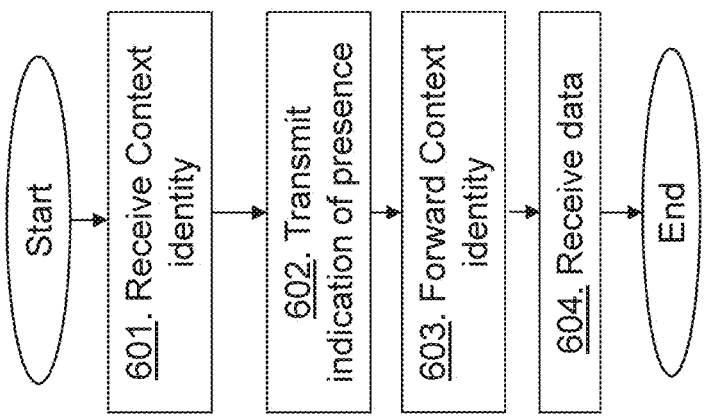
FIG. 6 is a flowchart depicting a method performed by a wireless device according to embodiments herein.

The method actions performed by the wireless device 10 for handling data of the wireless device 10 in the communication network 1 according to some embodiments will now be described with reference to a flowchart depicted in FIG. 6. The actions do not have to be taken in the order stated below, but may be taken in any suitable order. FIG. 6 discloses how the context identity mentioned in FIG. 5 action 503 above may be obtained and forwarded. The identifying of the first radio access network node 12 comprising context for the wireless device 10 and any buffered data destined for the wireless device 10 may be performed in a number of ways and usage of the context identity is one way of enabling the identification of the first radio access network node 12.

Action 601.

The wireless device 10 receives, from the first radio access network node 12 serving the wireless device 10 in the first service area 11, the context identity of the wireless device 10 identifying the context for the wireless device 10.

Action 602.

The wireless device 10 transmits, e.g. after moving into the second service area 14 of the second radio access network node 13, an indication to the network node being associated with or being the second radio access network node 13 lacking the context for the wireless device 10. The indication indicates the presence of the wireless device 10 at the second radio access network node 13. The network node may be the second radio access network node 13, or the core network node 15 associated with the second radio access network node 13 such as an MME. The indication may comprise information, which information indicates identity of the first radio access network node 12 comprising the context for the wireless device 10 and any buffered data destined for the wireless device 10, e.g. the TRA Update message sent by the wireless device 10 may comprise relevant information which helps to identify the previous Tracking RAN Area or network node comprising the context as well as any buffered data destined for the wireless device 10.

Action 603.

The wireless device 10 forwards, separately or simultaneously with the indication (preferably included in the same message), the context identity from the wireless device 10 to the network node, see action 502 above.

Action 604.

The wireless device 10 receives data, buffered at the first radio access network node 12, from the network node.

As explained above the context identity may be provided to the wireless device 10 by the first radio access network node 12 holding the context, either when the context is created or when the wireless device 10 is switched to a RRC Dormant state or possibly some time in between, and forwarded from the wireless device 10 to the second radio access network node 13 in e.g. the TRAU. This context identity may or may not also serve as an identifier of the wireless device 10 e.g. in signaling procedures across the radio interface. The context identity may be combined with data aiding determining location of the first radio access network node 12, e.g. an anchor node identity, into a single identifier.

The wireless device 10 may, in some embodiments, first determine whether to trigger a TRAU, e.g. determine if the second service area 14 is not in e.g. the tracking RAN area list of the wireless device 10. That being the case, the wireless device 10 may add the identity of the TRAS of the first service area 11 or first radio access network node 12 to the TRAU message comprising the context for the wireless device 10. The wireless device 10 then receives the Tracking RAN Areas Update Response from the network node, which TRAU response may comprise a paging indication. The wireless device 10 may then follow a paging procedure i.e. responds to the paging and receives data intended for the wireless device 10.

Figure 7:
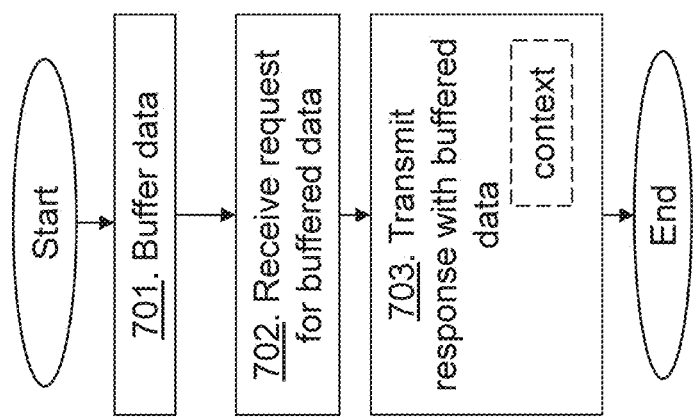
FIG. 7 is a flowchart depicting a method performed by a first radio access network node according to embodiments herein.

The method actions performed by the first radio access network node 12 for handling data of the wireless device 10 in the communication network 1 according to some embodiments will now be described with reference to a flowchart depicted in FIG. 7. The first radio access network node 12 comprises the context for the wireless device 10. The actions do not have to be taken in the order stated below, but may be taken in any suitable order.

Action 701.

The first radio access network node 12 buffers data for the wireless device 10.

Action 702.

The first radio access network node 12 receives, from the network node being associated with or being the second radio access network node 13, i.e. the network node is either the second radio access network node 13 or the core network node associated with the second radio access network node 13, lacking the context for the wireless device 10, a request for the data buffered for the wireless device 10. This may be after a RLF for the wireless device 10 in the first service area 11 or the wireless device 10 moving to another RAN area not being in the tracking RAN area list of the wireless device 10.

Action 703.

The first radio access network node 12 then transmits a response, to the network node, with the buffered data. The request may further request the context for the wireless device 10 and the response then further comprises the requested context.

Figure 8:
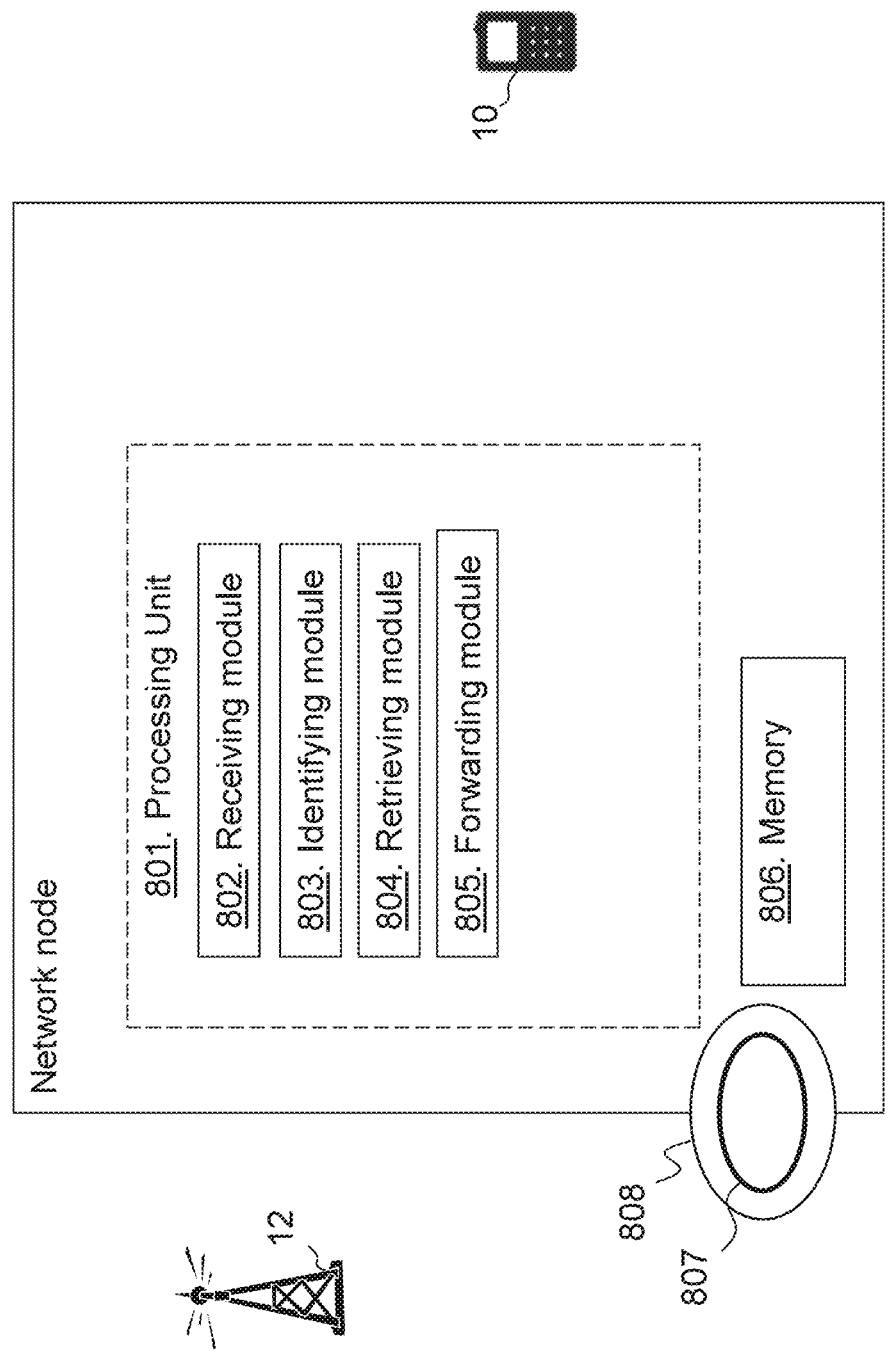
FIG. 8 is a block diagram depicting a network node according to embodiments herein.

FIG. 8 is a block diagram depicting the network node, exemplified above as the second radio access network node 13 or the core network node 15, according to embodiments herein for handling data of the wireless device 10 in the communication network 1. The network node may comprise a processing unit 801, one or more processors, configured to perform the methods herein.

The network node is configured to receive the indication from the wireless device 10, which indication indicates the presence of the wireless device at the second radio access network node 13 holding no context for the wireless device 10. The network node may comprise a receiving module 802. The processing unit 801 and/or the receiving module 802 may be configured to receive the indication from the wireless device 10. The indication may be a reestablishment of a connection or an Update of tracking RAN areas.

The network node is further configured to identify the first radio access network node 12 holding context for the wireless device 10 and any buffered data destined for the wireless device 10. The network node may comprise an identifying module 803. The processing unit 801 and/or the identifying module 803 may be configured to identify the first radio access network node 12 holding context for the wireless device 10 and any buffered data destined for the wireless device 10. The indication may comprise information, which information indicates identity of the first radio access network node 12 holding the context for the wireless device 10 and any buffered data destined for the wireless device 10. The network node, the processing unit 801 and/or the identifying module 803 may be configured to identify the first radio access network node 12 based on the information.

The network node is further configured to retrieve, from the identified first radio access network node 12, data buffered for the wireless device 10. The network node may comprise a retrieving module 804. The processing unit 801 and/or the retrieving module 804 may be configured to retrieve, from the identified first radio access network node 12, data buffered for the wireless device 10. The network node, the processing unit 801 and/or the retrieving module 804 may be configured to retrieve the data by being configured to request the identified first radio access network node 12 for the context for the wireless device 10 and data buffered for the wireless device 10, and to receive the response, from the identified first radio access network node 12, with the requested context and the data buffered for the wireless device 10. The network node, the processing unit 801 and/or the receiving module 802 may be configured to receive the context identity from the wireless device 10, which context identity identifies the context for the wireless device 10, and the network node, the processing unit 801 and/or the retrieving module 804 may further be configured to use the received context identity when retrieving the buffered data.

The network node is further configured to forward the retrieved data to the wireless device 10. The network node may comprise a forwarding module 805. The processing unit 801 and/or the forwarding module 805 may be configured to forward the retrieved data to the wireless device 10. The indication may be the TRAU and the network node, the processing unit 801 and/or the forwarding module 805 may be configured to forward the retrieved data by being configured to page the wireless device in the Tracking Radio Access Network Areas Response and, upon response of the paging, configured to deliver the retrieved data to the wireless device 10. As stated above the indication may be the TRAU and the network node, the processing unit 801 and/or the forwarding module 805 may be configured to forward the retrieved data by being configured to transmit the retrieved data in the Tracking Radio Access Network Areas Response. The network node, the processing unit 801 and/or the retrieving module 804 may be configured to retrieve the paging indication for the wireless device 10 from the first radio network node 12, and the network node, the processing unit 801 and/or the forwarding module 805 may be configured to forward the retrieved data by being configured to page the wireless device with the retrieved paging indication.

The network node further comprises a memory 806. The memory may comprise one or more memory units to be used to store data on, such as TRA information, buffered data, context of the wireless device 10, network node IDs, context IDs, applications to perform the methods disclosed herein when being executed, and similar.

The methods according to the embodiments described herein for the network node are respectively implemented by means of e.g. a computer program 807 or a computer program product, comprising instructions, i.e., software code portions, which, when executed on at least one processor, cause the at least one processor to carry out the actions described herein, as performed by the network node. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the network node. In some embodiments, the computer-readable storage medium may be a non-transitory computer-readable storage medium.

Figure 9:
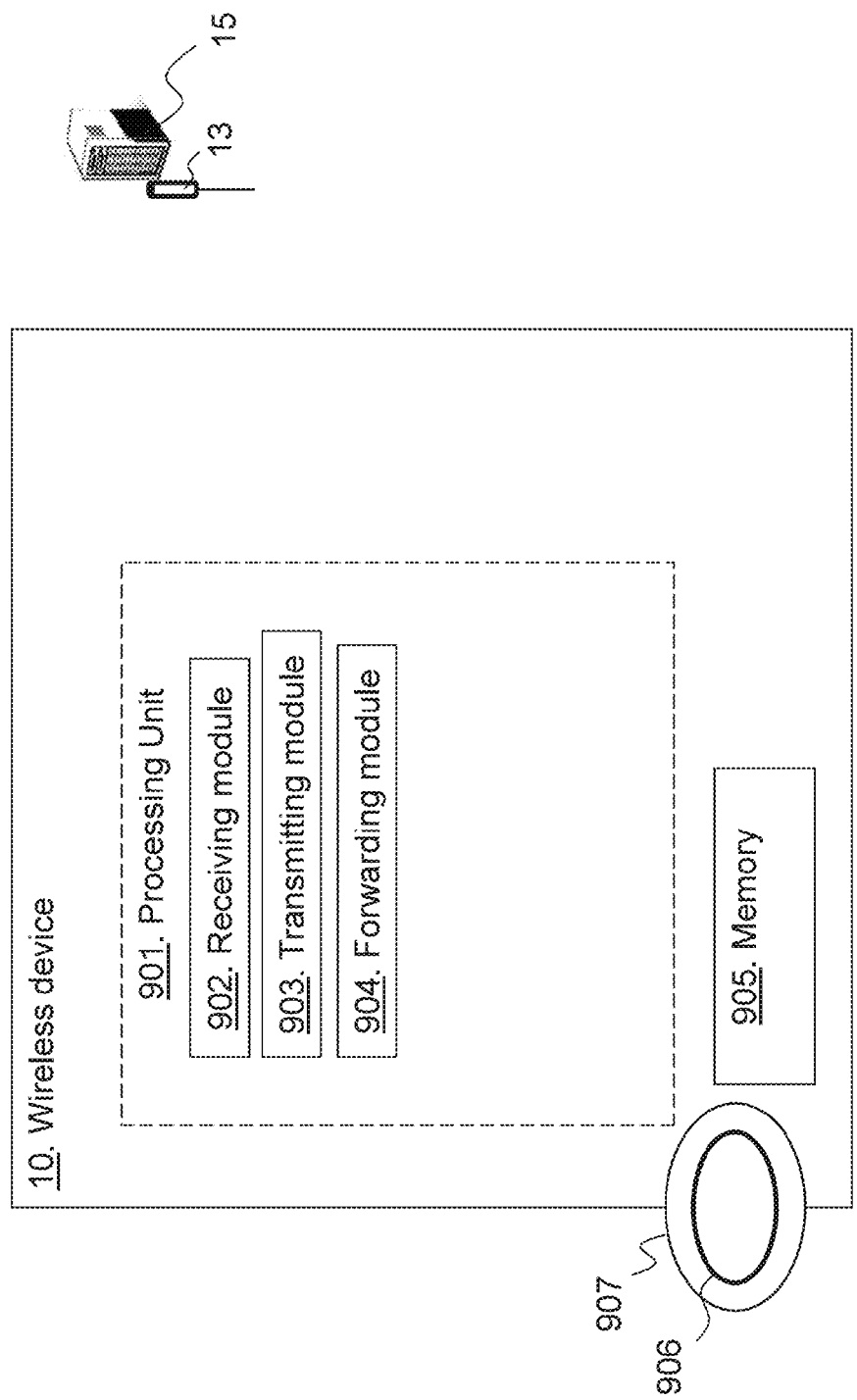
FIG. 9 is a block diagram depicting an wireless device according to embodiments herein.

FIG. 9 is a block diagram depicting the wireless device 10 according to embodiments herein for handling data of the wireless device 10 in the communication network 1. The wireless device 10 may comprise a processing unit 901, one or more processors, configured to perform the methods herein.

The wireless device 10 is configured to receive, from the first radio access network node 12 serving the wireless device 10 in the first service area 11 of the first radio access network node 12, the context identity identifying the context for the wireless device 10. The wireless device 10 may comprise a receiving module 902. The processing unit 901 and/or the receiving module 902 may be configured to receive, from the first radio access network node 12 serving the wireless device 10 in the first service area 11 of the first radio access network node 12, the context identity identifying the context for the wireless device 10.

The wireless device 10 is further configured to transmit the indication to the network node being associated with or being the second radio access network node 13 lacking the context for the wireless device 10. The indication indicates the presence of the wireless device 10 at the second radio access network node 13. The indication may comprise information, which information indicates identity of the first radio access network node 12 comprising the context for the wireless device 10 and any buffered data destined for the wireless device 10. The wireless device 10 may comprise a transmitting module 903. The processing unit 901 and/or the transmitting module 903 may be configured to transmit the indication to the network node being associated with or being the second radio access network node 13 lacking the context for the wireless device 10. The indication may be a TRAU or a reestablishment request after cell selection.

The wireless device 10 is also configured to forward the received context identity from the wireless device 10 to the network node. The wireless device 10 may comprise a forwarding module 904. The processing unit 901 and/or the forwarding module 904 may be configured to forward the received context identity from the wireless device 10 to the network node.

The wireless device 10 is configured to receive data, buffered at the first radio access network node 12, from the network node. The processing unit 901 and/or the receiving module 902 may be configured to receive data, buffered at the first radio access network node 12, from the network node.

The wireless device 10 further comprises a memory 905. The memory may comprise one or more memory units to be used to store data on, such as TRAU, TA list data, context of the wireless device, indications, network node IDs, context IDs, applications to perform the methods disclosed herein when being executed, and similar.

The methods according to the embodiments described herein for the wireless device 10 are respectively implemented by means of e.g. a computer program 906 or a computer program product, comprising instructions, i.e., software code portions, which, when executed on at least one processor, cause the at least one processor to carry out the actions described herein, as performed by the wireless device 10. The computer program 906 may be stored on a computer-readable storage medium 907, e.g. a disc or similar. The computer-readable storage medium 907, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 10:
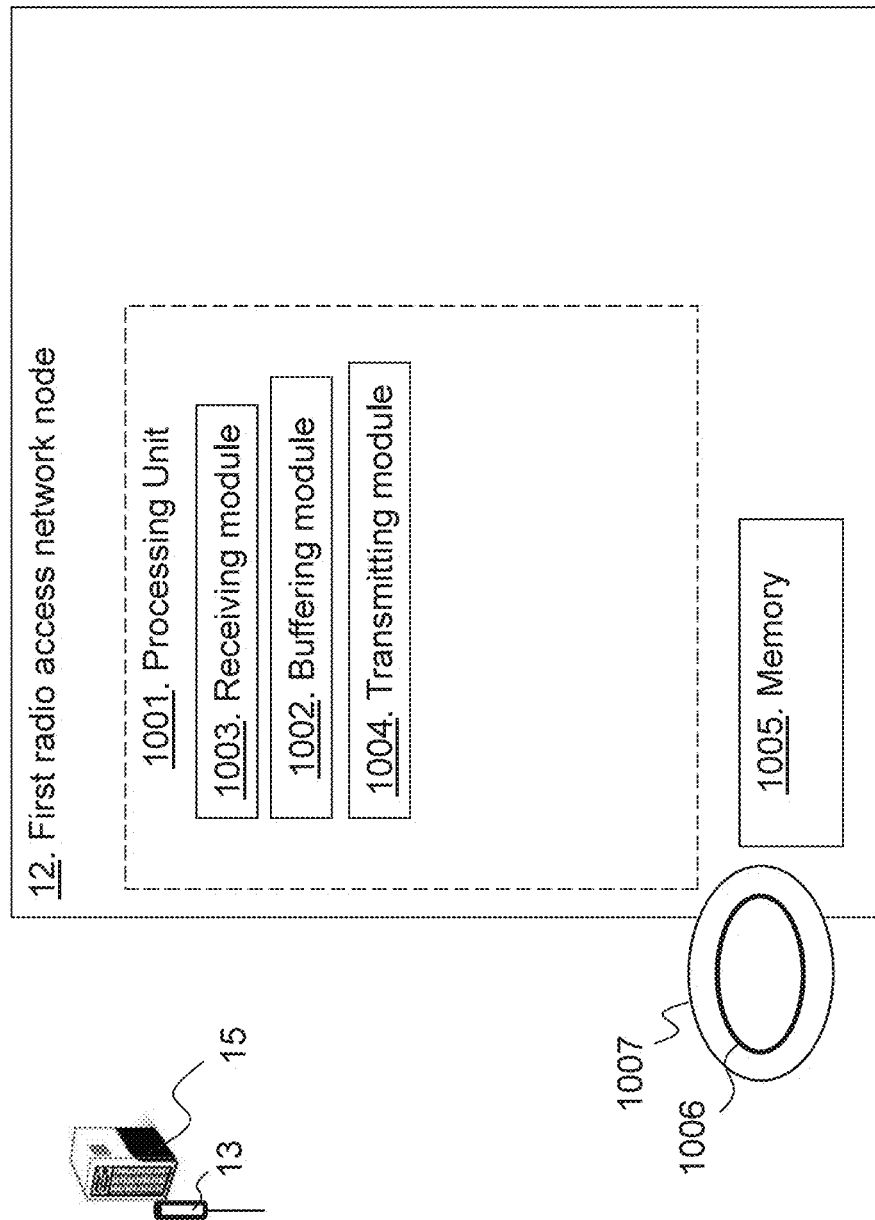
FIG. 10 is a block diagram depicting a first radio access network node according to embodiments herein.

FIG. 10 is a block diagram depicting the first radio access network node 12 according to embodiments herein, for handling data of the wireless device 10 in the communication network 1. The first radio access network node 12 may comprise a processing unit 1001, one or more processors, configured to perform the methods herein.

The first radio access network node 12 is configured to hold context for the wireless device 10. The first radio access network node 12 is also configured to buffer data for the wireless device 10. The first radio access network node 12 may comprise a buffering module 1002. The processing unit 1001 and/or the buffering module 1002 may be configured to buffer data for the wireless device 10.

The first radio access network node 12 is configured to receive, from the network node, being associated with or being the second radio access network node 13 lacking the context for the wireless device 10, the request for the buffered data for the wireless device 10. The first radio access network node 12 may comprise a receiving module 1003. The processing unit 1001 and/or the receiving module 1003 may be configured to receive, from the network node, being associated with or being the second radio access network node 13 lacking the context for the wireless device 10, the request for the buffered data for the wireless device 10.

The first radio access network node 12 is further configured to transmit the response, to the network node, with the buffered data. The first radio access network node 12 may comprise a transmitting module 1004. The processing unit 1001 and/or the transmitting module 1004 may be configured to transmit the response, to the network node, with the buffered data. The request may further request the context for the wireless device 10 and the response may then further comprise the requested context.

The first radio access network node 12 further comprises a memory 1005. The memory may comprise one or more memory units to be used to store data on, such as area information, buffered data, context of the wireless device, applications to perform the methods disclosed herein when being executed, and similar.

The methods according to the embodiments described herein for the first radio access network node 12 are respectively implemented by means of e.g. a computer program 1006 or a computer program product, comprising instructions, i.e., software code portions, which, when executed on at least one processor, cause the at least one processor to carry out the actions described herein, as performed by the first radio access network node 12. The computer program 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by the first radio access network node 12. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device, radio access network node or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling data of a wireless device in a communication network, the method comprising:
    receiving an indication from the wireless device, which indication indicates a presence of the wireless device at a second radio access network node holding no context for the wireless device;
    identifying a first radio access network node holding context for the wireless device and any buffered data destined for the wireless device;
    retrieving, from the first radio access network node, data buffered for the wireless device; and
    forwarding the retrieved data to the wireless device.

2. The method according to claim 1, wherein the retrieving comprises requesting, from the first radio access network node, the context for the wireless device and data buffered for the wireless device and receiving a response, from the first radio access network node, with the requested context and the data buffered for the wireless device.

3. The method according to claim 1, wherein the indication is a reestablishment of a connection or an Update of tracking Radio Access Network areas.

4. The method according to claim 3, wherein the indication is a Tracking Radio Access Network Areas Update and the forwarding comprises paging the wireless device in the Tracking Radio Access Network Areas Response and, upon response of the paging, delivering the retrieved data to the wireless device.

5. The method according to claim 3, wherein the indication is a Tracking Radio Access Network Areas Update and the forwarding comprises transmitting the retrieved data in the Tracking Radio Access Network Areas Response.

6. The method according to claim 1, wherein a paging indication for the wireless device is also retrieved from the first radio network node, and wherein the forwarding comprises paging the wireless device with the retrieved paging indication.

7. The method according to claim 1, wherein the indication comprises information, which indicates an identity of the first radio access network, and which information is used for identifying the first radio access network node.

8. The method according to claim 1, further comprising receiving a context identity from the wireless device, which context identity identifies the context for the wireless device, and using the received context identity when retrieving the buffered data.

9. A method performed by a wireless device for handling data of the wireless device in a communication network, the method comprising:
    receiving, from a first radio access network node serving the wireless device in a first service area of the first radio access network node, a context identity identifying a context for the wireless device;
    transmitting an indication to a network node being associated with or being a second radio access network node lacking the context for the wireless device, which indication indicates a presence of the wireless device at the second radio access network node;
    forwarding the received context identity from the wireless device to the network node; and
    receiving data, buffered at the first radio access network node, from the network node.

10. The method according to claim 9, wherein the indication comprises information, which information indicates an identity of the first radio access network node.

11. A method performed by a first radio access network node for handling data of a wireless device in a communication network, which first radio access network node holds context for the wireless device; the method comprising:
    buffering data for the wireless device;
    receiving, from a network node being associated with or being a second radio access network node lacking the context for the wireless device, a request for the buffered data for the wireless device; and
    transmitting a response, to the network node, with the buffered data.

12. The method according to claim 11, wherein the request further requests the context for the wireless device and the response further comprises the requested context.

13. A network node for handling data of a wireless device in a communication network, the network node comprising communication and processing circuitry configured to:
    receive an indication from the wireless device, which indication indicates a presence of the wireless device at a second radio access network node holding no context for the wireless device;
    identify a first radio access network node holding context for the wireless device and any buffered data destined for the wireless device;
    retrieve, from the first radio access network node, data buffered for the wireless device; and to
    forward the retrieved data to the wireless device.

14. The network node according to claim 13, being configured to retrieve the data by being configured to request, from the first radio access network node, the context for the wireless device and data buffered for the wireless device, and to receive a response, from the first radio access network node, with the requested context and the data buffered for the wireless device.

15. The network node according to claim 13, wherein the indication is a reestablishment of a connection or an Update of tracking Radio Access Network areas.

16. The network node according to claim 15, wherein the indication is a Tracking Radio Access Network Areas Update and the network node is configured to forward the retrieved data by being configured to page the wireless device in a Tracking Radio Access Network Areas Response and, upon response of the paging, configured to deliver the retrieved data to the wireless device.

17. The network node according to claim 15, wherein the indication is a Tracking Radio Access Network Areas Update and the network node is configured to forward the retrieved data by being configured to transmit the retrieved data in the Tracking Radio Access Network Areas Response.

18. The network node according to claim 13, further being configured to retrieve a paging indication for the wireless device from the first radio network node, and the network node is configured to forward the retrieved data by being configured to page the wireless device with the retrieved paging indication.

19. The network node according to claim 13, wherein the indication comprises information, which information indicates an identity of the first radio access network node, and the network node is configured to identify the first radio access network node based on the information.

20. The network node according to claim 13, further being configured to receive a context identity from the wireless device, which context identity identifies the context for the wireless device, and further being configured to use the received context identity when retrieving the buffered data.

21. A wireless device for handling data of the wireless device in a communication network, the wireless device comprising communication and processing circuitry being configured to:
receive, from a first radio access network node serving the wireless device in a first service area of the first radio access network node, a context identity identifying a context for the wireless device;
transmit an indication to a network node being associated with or being a second radio access network node lacking the context for the wireless device, which indication indicates a presence of the wireless device at the second radio access network node;
forward the received context identity from the wireless device to the network node; and to
receive data, buffered at the first radio access network node, from the network node.

22. The wireless device according to claim 21, wherein the indication comprises information, which information indicates an identity of the first radio access network node.

23. A first radio access network node for handling data of a wireless device in a communication network, which first radio access network node holds context for the wireless device; the first radio access network node comprising communication and processing circuitry configured to:
buffer data for the wireless device;
receive, from a network node, being associated with or being a second radio access network node lacking the context for the wireless device, a request for the buffered data for the wireless device; and to
transmit a response, to the network node, with the buffered data.

24. The first radio access network node according to claim 23, wherein the request further requests the context for the wireless device and the response further comprises the requested context.

25. A non-transitory computer-readable medium storing a computer program comprising program instructions that, when executed by processing circuitry of a network node in a communication network, configures the network node for handling data of a wireless device in the communication network, the computer program comprising program instructions that cause the network node to:
receive an indication from the wireless device, which indication indicates a presence of the wireless device at a second radio access network node holding no context for the wireless device;
identify a first radio access network node holding context for the wireless device and any buffered data destined for the wireless device;
retrieve, from the identified first radio access network node, data buffered for the wireless device; and
forward the retrieved data to the wireless device.

* * * * *